United States Patent
Colwell et al.

(10) Patent No.: US 9,659,058 B2
(45) Date of Patent: May 23, 2017

(54) METHODS AND SYSTEMS FOR FEDERATION OF RESULTS FROM SEARCH INDEXING

(71) Applicant: X1 Discovery, Inc., Pasadena, CA (US)

(72) Inventors: Steven Lee Colwell, Santa Barbara, CA (US); Eric Schmidt, Burlingame, CA (US)

(73) Assignee: X1 DISCOVERY, INC., Pasadena, CA (US)

( * ) Notice: Subject to any disclaimer, the term of this patent is extended or adjusted under 35 U.S.C. 154(b) by 139 days.

(21) Appl. No.: 14/201,623

(22) Filed: Mar. 7, 2014

(65) Prior Publication Data
US 2014/0289223 A1    Sep. 25, 2014

Related U.S. Application Data

(60) Provisional application No. 61/804,576, filed on Mar. 22, 2013.

(51) Int. Cl.
G06F 17/30    (2006.01)

(52) U.S. Cl.
CPC .............................. *G06F 17/30477* (2013.01)

(58) Field of Classification Search
CPC ................................................. G06F 17/30477
USPC ........................................................ 707/722
See application file for complete search history.

(56) References Cited

U.S. PATENT DOCUMENTS

| 5,111,398 A | 5/1992 | Nunberg et al. |
| 5,202,982 A | 4/1993 | Gramlich |
| 5,303,361 A | 4/1994 | Colwell et al. |
| 5,659,732 A | 8/1997 | Kirsch |
| 5,671,426 A | 9/1997 | Armstrong, III |
| 5,692,173 A | 11/1997 | Chew |
| 5,704,060 A | 12/1997 | Del Monte |

(Continued)

FOREIGN PATENT DOCUMENTS

| WO | WO 99/01802 | 1/1999 |
| WO | WO 99/39286 | 8/1999 |

(Continued)

OTHER PUBLICATIONS

"Lotus Magellan Explorer's Guide," © 1989 Lotus Development Corporation.

(Continued)

*Primary Examiner* — Tarek Chbouki
(74) *Attorney, Agent, or Firm* — Knobbe, Martens, Olson & Bear LLP

(57) ABSTRACT

Systems and methods enable federation of search results. An identification of a first data source associated with a first schema is received by the system, the first data source comprising data of a first type. An identification of a second data source associated with a second schema is received, the second data source comprising data of a second type, the second type different than the first type. An identification of a plurality of fields for a results set user interface, a mapping of the data of the first type to a first field of the results set user interface, and a mapping of the data of the second type to the first field of the results set user interface, are accessed. Data of the first type and data of the second type are merged and provided for display in the first field on a user terminal.

24 Claims, 7 Drawing Sheets

(56) References Cited

U.S. PATENT DOCUMENTS

| | | |
|---|---|---|
| 5,704,560 A | 1/1998 | Wimmer |
| 5,717,923 A | 2/1998 | Dedrick |
| 5,721,897 A | 2/1998 | Rubinstein |
| 5,724,424 A | 3/1998 | Gifford |
| 5,724,521 A | 3/1998 | Dedrick |
| 5,724,524 A | 3/1998 | Hunt et al. |
| 5,748,954 A | 5/1998 | Mauldin |
| 5,752,238 A | 5/1998 | Dedrick |
| 5,754,938 A | 5/1998 | Herz et al. |
| 5,754,939 A | 5/1998 | Herz et al. |
| 5,768,521 A | 6/1998 | Dedrick |
| 5,778,361 A | 7/1998 | Nanjo et al. |
| 5,794,210 A | 8/1998 | Goldhaber et al. |
| 5,819,273 A | 10/1998 | Vora et al. |
| 5,826,241 A | 10/1998 | Stein et al. |
| 5,832,208 A | 11/1998 | Chen et al. |
| 5,835,087 A | 11/1998 | Herz et al. |
| 5,848,397 A | 12/1998 | Marsh et al. |
| 5,848,407 A | 12/1998 | Ishikawa et al. |
| 5,852,820 A | 12/1998 | Burrows |
| 5,855,008 A | 12/1998 | Goldhaber et al. |
| 5,864,845 A | 1/1999 | Voorhees et al. |
| 5,864,846 A | 1/1999 | Voorhees et al. |
| 5,903,882 A | 5/1999 | Asay et al. |
| 5,907,837 A | 5/1999 | Ferrel et al. |
| 5,918,014 A | 6/1999 | Robinson |
| 5,920,854 A | 7/1999 | Kirsch et al. |
| 5,920,859 A | 7/1999 | Li |
| 6,006,225 A | 12/1999 | Bowman |
| 6,029,195 A | 2/2000 | Herz |
| 6,035,325 A | 3/2000 | Potts |
| 6,070,158 A * | 5/2000 | Kirsch .............. G06F 17/30616 |
| 6,073,133 A | 6/2000 | Chrabaszcz |
| 6,078,866 A | 6/2000 | Buck et al. |
| 6,085,193 A | 7/2000 | Malkin et al. |
| 6,112,172 A | 8/2000 | True et al. |
| 6,182,068 B1 | 1/2001 | Culliss |
| 6,216,122 B1 | 4/2001 | Elson |
| 6,269,361 B1 | 7/2001 | Davis et al. |
| 6,330,567 B1 | 12/2001 | Chao |
| 6,366,923 B1 | 4/2002 | Lenk et al. |
| 6,421,675 B1 | 7/2002 | Ryan et al. |
| 6,496,820 B1 | 12/2002 | Tada et al. |
| 6,513,028 B1 * | 1/2003 | Lee ................... G06F 17/30327 |
| 6,564,213 B1 | 5/2003 | Ortega et al. |
| 6,606,304 B1 | 8/2003 | Grinter et al. |
| 6,615,237 B1 | 9/2003 | Kyne et al. |
| 6,638,314 B1 | 10/2003 | Meyerzon |
| 6,665,668 B1 | 12/2003 | Sugaya et al. |
| 6,700,591 B1 * | 3/2004 | Sharpe ................ G06F 3/04897 715/762 |
| 6,704,747 B1 | 3/2004 | Fong |
| 6,711,565 B1 | 3/2004 | Subramaniam et al. |
| 6,751,603 B1 | 6/2004 | Bauer et al. |
| 6,757,713 B1 | 6/2004 | Ogilvie et al. |
| 6,826,594 B1 | 11/2004 | Pettersen |
| 6,847,959 B1 | 1/2005 | Arrouye et al. |
| 6,862,713 B1 | 3/2005 | Kraft et al. |
| 6,873,982 B1 | 3/2005 | Bates et al. |
| 6,904,450 B1 | 6/2005 | King et al. |
| 6,961,731 B2 | 11/2005 | Holbrook |
| 7,035,903 B1 | 4/2006 | Baldonado |
| 7,047,502 B2 | 5/2006 | Petropoulos et al. |
| 7,054,855 B2 | 5/2006 | Basso et al. |
| 7,069,497 B1 | 6/2006 | Desai |
| 7,370,035 B2 | 5/2008 | Gross et al. |
| 7,424,510 B2 | 9/2008 | Gross et al. |
| 7,424,676 B1 * | 9/2008 | Carlson ................ G06Q 10/107 715/273 |
| 7,496,559 B2 | 2/2009 | Gross et al. |
| 7,702,636 B1 * | 4/2010 | Sholtis ............. G06F 17/30566 707/999.1 |
| 7,707,255 B2 * | 4/2010 | Satterfield ............ G06Q 10/107 709/206 |
| 7,945,914 B2 | 5/2011 | Hasiuk et al. |
| 8,019,741 B2 | 9/2011 | Gross et al. |
| 8,086,953 B1 | 12/2011 | Gabber |
| 8,498,977 B2 | 7/2013 | Gross et al. |
| 2001/0027406 A1 | 10/2001 | Araki et al. |
| 2001/0027450 A1 | 10/2001 | Shinoda |
| 2001/0029508 A1 | 10/2001 | Okada et al. |
| 2001/0039490 A1 | 11/2001 | Verbitsky et al. |
| 2002/0004735 A1 | 1/2002 | Gross |
| 2002/0019679 A1 | 2/2002 | Okada et al. |
| 2002/0055981 A1 | 5/2002 | Spaey et al. |
| 2002/0073078 A1 | 6/2002 | Ku et al. |
| 2002/0087408 A1 | 7/2002 | Burnett |
| 2002/0092019 A1 | 7/2002 | Marcus |
| 2002/0111962 A1 | 8/2002 | Crucs |
| 2002/0165707 A1 | 11/2002 | Call |
| 2002/0169763 A1 | 11/2002 | Tada et al. |
| 2002/0178009 A1 | 11/2002 | Firman |
| 2002/0184317 A1 | 12/2002 | Thankachan |
| 2003/0014415 A1 | 1/2003 | Weiss et al. |
| 2003/0037321 A1 | 2/2003 | Bowen |
| 2003/0130993 A1 | 7/2003 | Mendelevitch et al. |
| 2003/0171910 A1 | 9/2003 | Abir |
| 2003/0225764 A1 | 12/2003 | Smith et al. |
| 2003/0227489 A1 | 12/2003 | Arend et al. |
| 2003/0229898 A1 | 12/2003 | Babu et al. |
| 2003/0233419 A1 | 12/2003 | Beringer |
| 2004/0073443 A1 | 4/2004 | Gabrick et al. |
| 2004/0128285 A1 | 7/2004 | Green |
| 2004/0133564 A1 | 7/2004 | Gross et al. |
| 2004/0143569 A1 | 7/2004 | Gross et al. |
| 2004/0172389 A1 | 9/2004 | Galai et al. |
| 2004/0205514 A1 | 10/2004 | Sommerer |
| 2004/0230891 A1 | 11/2004 | Pravetz |
| 2005/0204191 A1 | 9/2005 | McNally |
| 2005/0223061 A1 * | 10/2005 | Auerbach ............ G06Q 10/107 709/206 |
| 2005/0256846 A1 | 11/2005 | Zigmond et al. |
| 2006/0064394 A1 | 3/2006 | Dettinger |
| 2006/0095424 A1 | 5/2006 | Petropoulos et al. |
| 2006/0168067 A1 | 7/2006 | Carlson et al. |
| 2006/0195379 A1 * | 8/2006 | Abecassis ............ G06Q 10/107 705/35 |
| 2006/0195481 A1 * | 8/2006 | Arrouye ............ G06F 17/30067 |
| 2006/0224604 A1 * | 10/2006 | Landsman ........... G06Q 10/107 |
| 2007/0192423 A1 * | 8/2007 | Karlson ............... G06Q 10/109 709/206 |
| 2007/0226204 A1 * | 9/2007 | Feldman ........... G06F 17/30958 |
| 2007/0240035 A1 | 10/2007 | Sthanikam |
| 2008/0114731 A1 | 5/2008 | Kumar |
| 2008/0133487 A1 * | 6/2008 | Gross ................ G06F 17/30864 |
| 2008/0141365 A1 | 6/2008 | Soegtrop |
| 2008/0147818 A1 * | 6/2008 | Sabo ....................... G06Q 10/00 709/206 |
| 2008/0208812 A1 * | 8/2008 | Quoc ...................... G06Q 10/10 |
| 2009/0006332 A1 | 1/2009 | Mowatt et al. |
| 2009/0119268 A1 | 5/2009 | Bandaru |
| 2009/0150363 A1 | 6/2009 | Gross et al. |
| 2010/0023502 A1 | 1/2010 | Marlow |
| 2010/0169320 A1 * | 7/2010 | Patnam ............. G06F 17/30696 707/737 |
| 2010/0274783 A1 | 10/2010 | Chevalier et al. |
| 2011/0055177 A1 * | 3/2011 | Chakra ............. G06F 17/30165 707/695 |
| 2011/0126142 A1 * | 5/2011 | Zhou .................. G05B 19/4183 715/771 |
| 2011/0208775 A1 | 8/2011 | Brette et al. |
| 2012/0017178 A1 * | 1/2012 | Mulloy .................. G06F 9/4443 715/835 |
| 2012/0197912 A1 * | 8/2012 | Grigsby ............. G06F 17/3053 707/752 |
| 2012/0278303 A1 | 11/2012 | Krishnaprasad et al. |
| 2012/0290555 A1 | 11/2012 | Wu et al. |
| 2012/0290592 A1 | 11/2012 | Ishii |
| 2012/0330887 A1 | 12/2012 | Young |
| 2013/0042083 A1 | 2/2013 | Mutalik |
| 2013/0166909 A1 | 6/2013 | Agrawal |
| 2013/0326333 A1 | 12/2013 | Hashmi |

(56) References Cited

U.S. PATENT DOCUMENTS

| | | | | |
|---|---|---|---|---|
| 2014/0310324 A1* | 10/2014 | Branton | G06F 7/24 | 707/830 |
| 2014/0344249 A1* | 11/2014 | Magistrado | G06Q 10/107 | 707/722 |
| 2015/0161159 A1 | 6/2015 | Provenzano | | |
| 2015/0278764 A1* | 10/2015 | Patil | G06Q 10/103 | 705/301 |

FOREIGN PATENT DOCUMENTS

| WO | WO 99/48028 | 9/1999 |
|---|---|---|
| WO | WO 00/16218 | 3/2000 |
| WO | WO 00/41090 | 7/2000 |
| WO | WO 00/67159 | 11/2000 |
| WO | WO 2004/023243 A2 | 3/2004 |

OTHER PUBLICATIONS

"Lotus Magellan Product Information Guide," Circa 1989.
Barth, Steve, "Personal Toolkit: Navigating Information and Ideas," KMWorld Apr. 2003, vol. 12, Issue 4; printed from http://www.kmworld.com/publications/magazine/index.cfm?action=readarticle&Article_id+1505&publication_id=1.
Chapter 14, Section 14.5; "JavaScript & DHTML Cookbook" by Danny Goodman; ISBN: 0-596-00467-2; Publisher: O'Reilly; Print Publication Date Apr. 1, 2003.
Computing Service, Email Addresses in Microsoft Outlook 98, Dec. 5, 2000, pp. 1-3.
Ellison, Carol, "Info to Go," Jun. 30, 2002; printed from http://www.pcmag.com/article2/0, 1759,3575,00.asp.
Halpin, Jon, "PC Data Finder Goes A-Hunting," Jun. 19, 2001; printed from http://www.pcmag.com/article2/0,4149,144228,00.asp.
http://www2.essex.ac.uk/cs/services/email/addressing2.html—searched on www.waybackmachine.com—Internet Archive Wayback Machine, Search Results for Jan. 1, 1996-Mar. 5, 2007.
International Search Report from corresponding PCT Application PCT/US2003/027241, filed Sep. 3, 2003.
Inverted index, Wikipedia, http://en.wikipedia.org/wiki/Inverted_index; Dec. 12, 2006.
Pogue, David, *Finding Files and Web Sites with Sherlock 2*, MAC OS 9: The Missing Manual, Chapter 15, pp. 257-278, Mar. 30, 2000.
Proximity search (text), Wikipedia, http://en.wikipedia.org/wiki/Proximity_search_%28text%29; Dec. 12, 2006.
Sherman, Chris, "Enfish Tracker Pro," © Jan. 1999; printed from http://www.onlinemag.net/OL1999/sherman1.html.
Shneiderman, B., et al., *Clarifying Search: A User-Interface Framework for Test Searches*, D-Lib Magazine, Jan. 1997.
Shokouhi, Milad, and Si, Luo, Foundations and Trends® in Information Retrieval, vol. 5, No. 1 (2011) 1-102 © 2011, DOI: 10.1561/1500000010.
Stop words, Wikipedia, http://en.wikipedia.org/wiki/Stop_words; Dec. 12, 2006.
Supplementary Search Report for EP 03794539.1, filed Sep. 3, 2003.

* cited by examiner

| Index A | |
|---|---|
| data type: string | |
| sub-index 1 | sub-index 2 |
| 1 | 1000 |
| 10 | 11 |
| 100 | 200 |
| 2 | bat |
| 20 | cat |
| ape | dog |

| Index B | |
|---|---|
| data type: number | |
| sub-index 1 | sub-index 2 |
| 1 | 10 |
| 2 | 11 |
| 20 | 2000 |
| 100 | 2100 |
| 101 | 2200 |
| 102 | 2300 |

| Index C | |
|---|---|
| data type: date | |
| sub-index 1 | sub-index 2 |
| 1971-08-12 | 2001-01-01 |
| 1999-09-09 | 2002-02-02 |
| 2013-01-05 | 2003-03-03 |
| 2013-02-01 | 2004-04-04 |
| 2013-02-02 | 2005-05-05 |
| 2013-10-10 | 2006-06-06 |

FIG. 7

METHODS AND SYSTEMS FOR FEDERATION OF RESULTS FROM SEARCH INDEXING

CROSS-REFERENCE TO RELATED APPLICATIONS

Any and all applications for which a foreign or domestic priority claim is identified in the Application Data Sheet as filed with the present application, are hereby incorporated by reference in their entirety under 37 CFR 1.57.

BACKGROUND OF THE INVENTION

Field of the Invention

The present invention relates generally to data processing, and in particular to systems and methods for performing search indexing and providing search results.

Description of the Related Art

Conventional search applications are structured to work when searching a single index or displaying a single results set from another search provider. However, conventional search applications fail to provide an effective means to combine the search results into a single unified view and allow the user to interact with all search results in one place.

For example, many search engines will either not handle data that has not been processed directly by that search engine or will show the results sets in multiple separate view panes or tabs that must be reviewed separately and cannot be sorted or refined together. If the user needs to find more items or execute another search, the user must adjust the search terms and then page through the results sets tab by tab. Because of the difficulty of review, the user will often abandon search efforts or choose to review just one set or tab of the search results, or will stop refining the search while there are still numerous results and will adopt a tedious review of each responsive item in the results set.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Methods and systems for federation of data are described herein.

An example aspect includes a method of federating data, such as search results, the method comprising: receiving an identification of a first data source associated with a first schema, the first data source comprising data of a first type; receiving an identification of a second data source associated with a second schema, the second data source comprising data of a second type, the second type different than the first type; accessing an identification of a plurality of fields for a results set user interface; accessing a mapping of the data of the first type to a first field of the results set user interface; accessing a mapping of the data of the second type to the first field of the results set user interface; causing, at least in part, data of the first type from the first data source and data of the second type from the second data source to be merged and displayed in the first field on a user terminal.

An example aspect includes a search federation system, comprising: a computing system comprising hardware; a non-transitory computer storage medium having stored thereon executable instructions that direct the computing system to perform operations comprising: receiving an identification of a first data source associated with a first schema, the first data source comprising data of a first type; receiving an identification of a second data source associated with a second schema, the second data source comprising data of a second type, the second type different than the first type; accessing an identification of a plurality of fields for a results set user interface; accessing a mapping of the data of the first type to a first field of the results set user interface; accessing a mapping of the data of the second type to the first field of the results set user interface; causing, at least in part, data of the first type from the first data source and data of the second type from the second data source to be merged and displayed in the first field on a user terminal.

An example aspect includes a non-transitory computer storage medium having stored thereon executable instructions that when executed by a computer system direct the computing system to perform operations comprising: receiving an identification of a first data source associated with a first schema, the first data source comprising data of a first type; receiving an identification of a second data source associated with a second schema, the second data source comprising data of a second type, the second type different than the first type; accessing an identification of a plurality of fields for a results set user interface; accessing a mapping of the data of the first type to a first field of the results set user interface; accessing a mapping of the data of the second type to the first field of the results set user interface; causing, at least in part, data of the first type from the first data source and data of the second type from the second data source to be merged and displayed in the first field on a user terminal.

BRIEF DESCRIPTION OF THE DRAWINGS

Embodiments will now be described with reference to the drawings summarized below. These drawings and the associated description are provided to illustrate example embodiments, and not to limit the scope of the invention.

FIG. 7 illustrates data type examples.

DETAILED DESCRIPTION

Figure 1:
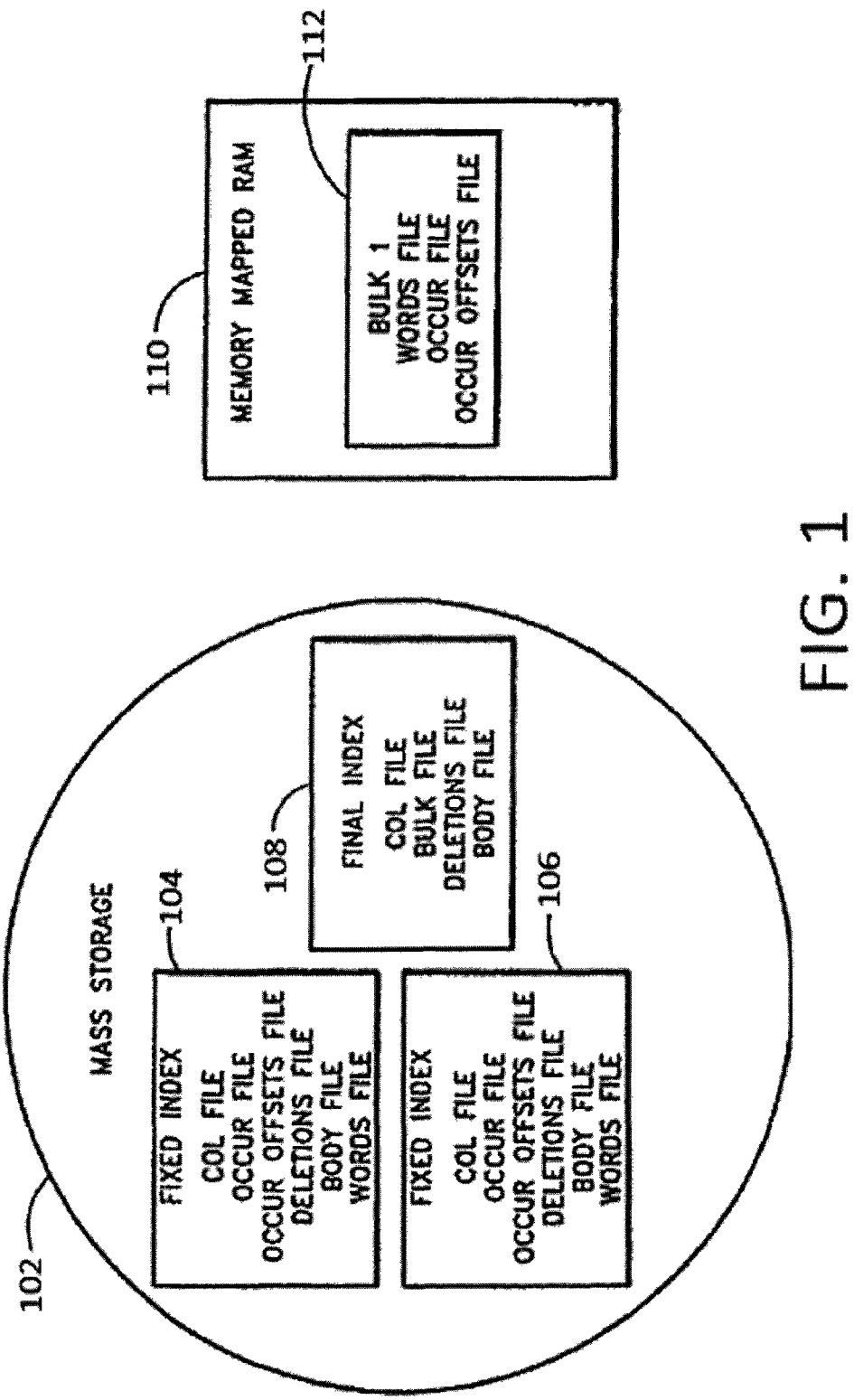
FIG. 1 illustrates an example index configuration.

Methods and systems for federation of search results are described herein.

An example embodiment enables a plurality of sets of results to be combined in a single results set. Optionally, certain embodiments enable the user to see some or all of the documents or data included in the combined result set. Optionally, mapping of different data types from different data sources to a results set column may be performed. The mapping may be specified by an end user or the mapping may be a default mapping that the end user can modify. Optionally, a search field is provided. As a user incrementally enters characters of search terms into the field, the search engine causes the results set displayed to the user to correspondingly decrease, even though these results are spread across different unique indexes. Optionally, the user can continue to refine and adjust the search results until the responsive documents/data are filtered down to a relatively small set of results, including the potential to refine down to a single document or item of data. Thus, optionally, the user can perform such search filtering, refinement, and review in a single displayed scrollable area (e.g., pane) of results, optionally regardless of the number of documents identified in the search results and optionally even if the search results are from a plurality of indexes that have little or no overlap in their underlying schema.

In an illustrative example, a search may be executed against two or more indexes from the following: an index for emails and email attachments, an index for files, an index for calendar items, an index for contacts, an index for tasks, an index for media (e.g., music files, video files, image files), an index for notes.

In another illustrative example, a search may be executed against one or more local indexes (e.g., an index for emails and email attachments, an index for files, an index for calendar items, an index for contacts, an index for tasks, and an index for notes) and/or one or more indexes from one or more remote sources. By way of illustrative example, the remote source may be another search engine such as Windows Search, SharePoint, Google Desktop Search, IBM Enterprise Content Management, Jive, Oracle WebCenter, Box, etc., or a remote search index stored on a server or personal computing device (e.g., a laptop computer, desktop computer, tablet computer, smart phone, etc.).

Optionally, if the index exists on a remote source, certain embodiments build a local index corresponding to the remote results set as they are returned by the remote source by constructing an index, such as an inverted index, of the metadata provided in that results set. The remotely returned values can be sorted, displayed, and/or refined in the same or similar fashion as the locally indexed data. This index, by its nature, may be transient and may optionally be deleted and rebuilt when the search request against the remote source is altered and/or resubmitted. Optionally, this transient index may be retained if and as long as the new search request was more restrictive (included additional search terms) than the original search request.

Optionally, in addition or instead, a local index for remote data is first created by indexing the data in place (e.g., wherein the processing system has direct access to the location where data is stored, without having to copy the data in order to perform the indexing) and then executing a search against two or more data sources, including a pre-existing local index. By way of illustrative example, the remote data may be a web email, calendar, or contacts data source (e.g., Gmail, Yahoo, AOL, etc.), a database (e.g., MySQL, SQL Server, Oracle, etc.), and/or a document management system (e.g., SharePoint, Documentum, etc.).

In another illustrative example, a search may be executed against any data source, optionally including pre-existing local data sources; remote indexes controlled and created by third parties, indexes controlled and created by the system taught in U.S. Pat. No. 7,370,035, which is hereby incorporated by reference herein in its entirety, and/or locally indexed remote data sources.

The indexes may optionally be constructed as a reverse or inverted index. Optionally, a given search index may be created based on a defined schema (e.g., a schema that defines the fields (e.g., columns) of data that are to be returned and displayed to the end user as a representation of a matching item against the search term). A given column corresponds to a field of data that is appropriate for the type of data being indexed. For example, results sets from an email index may include such fields as: from; to; subject; cc; bcc; date sent, etc. By way of contrast, results sets from a file index may include: folder path; file name; file size; date modified, etc. A given index may have its own discrete schema of data fields/columns that is appropriate to the given data type and which may have little to no overlap with other indexes that were created for other data sources.

A given index may optionally be constructed in blocks. For example, a set of blocks may include an incremental bulk/block in memory (e.g., volatile memory) and/or a finished bulk/block that can be stored to non-volatile mass memory (e.g., a hard magnetic drive, a FLASH drive, battery backed random access memory, etc.). A given bulk may constitute a plurality of separate files or a single file containing the same or equivalent data.

FIG. 1 illustrates an example index configuration, although other index configurations, types and structures may be used. A given target type can be associated with its own corresponding set of fixed indexes and bulk. Advantageously, by having separate sets of indexes for each target type, search and indexing can be performed relatively faster. However, in other embodiments, the same index or index set can be used for multiple or all target types. Optionally, indexes are built by the system incrementally. For example, two or more previously built sub-indexes may be merged into a combined index. Optionally, the index merger process may be triggered upon a specified number of sub-indexes reaching a specified size within a certain range of tolerance. Once a given sub-index reaches the specified size (or within the range of tolerance of the specified size) the sub-index may be closed. Once the specified number of sub-indexes are closed, they may be merged into a single merged index. The merged index may in turn be merged into a large merged index once a specified number of merged indexes of about the same size are available for merger into a larger merged index. The example index configuration illustrated in FIG. 1 includes fixed indexes 104, 106, 108 stored on mass storage media 102, which can be, for example a magnetic or optical disk drive. In this example, fixed index 104 is a merged index (e.g., of a specified number of previously built closed sub-indexes) and is larger than fixed indexes 106, 108 which are non-merged index. In this example, index 108 is the final index, that is, the index with the most recent additions and/or deletions. In this example, the index 106 is built and so is closed. The index 106 may be built to be approximately the same size as one of the indexes merged into merged index 104. The index 104 may also be merged into a merged index once there are a specified number of closed indexes of the appropriate size (e.g., similar in size) available. The index 108 in this example is in the process of being built and so is still open. The final index 108 includes the information from the bulk 112. The bulk 112 optionally includes an "occur" file, which is the main inverted index data file. An "occur-offsets" file may also be generated and included. The occur-offsets file stores pointers into the "occur" file.

The bulk 112 optionally includes a "words" file that comprises a list of the words that occur in the target files, a "deletions" file that lists indexed documents or files that have since been deleted, and a "body" file. The body file content may be used for a view pane/area display when the actual document or document is not available or may become unavailable when the content is needed for display in the view pane. The body file can be particularly useful for more transient files, such as emails. Advantageously, the bulk 112 is optionally stored in volatile RAM 110 so that additions and deletions can be made very quickly, without requiring constant modification of the final index 108 stored on slower non-volatile mass storage media 102. Optionally, some or all the indexes can be read from relatively slower non-volatile memory into relatively faster volatile RAM 110 to increase search speed. Upon shut-down of the search application, the bulk 112 may be written back to the index 108 for storage on the non-volatile mass memory media 102.

The user is enabled to select which data sources are included in the results set, from one source to all available sources or any subset of sources. The user is further enabled to choose which field of data for a given source is mapped to and displayed in a given results set column for each of the data sources. Optionally, a user interface may enable the user to modify a preexisting mapping (e.g., a default mapping).

For example, a results set user interface may include some or all of the following columns of data (or additional data columns or other fields of data): Name, Document Type, Date/Time, From, To, Subject, Folder Name, Path, Source Type, Status, Attachments, Size, Calendar Event Start Time, Calendar Event End Time, Calendar Event Recurrence, Calendar Event Location, Calendar Event Required Attendees, Calendar Event Attachments, etc. An example email data source may include some or all of the following fields: Status (e.g., read, unread), From, To, cc, bcc, Subject, Date/Time, Folder Name, Attachment Type, Attachment Size, Folder Name, etc. A calendar data source may include some or all of the following fields: Subject, Start Time, End Time, Recurrence, Location, Required Attendees, Attachments. An example contact data source may include some or all of the following fields: File As, Email Address, Mobile Phone, Work Phone, Company, Job Title, Categories, Physical Address, Notes, etc. An example files data source may include some or all of the following fields: Name, Document Type, Date/Time Created, Date/Time Last Edited, Size, Path, Source Type, Extension, etc. An example tasks data source may include some or all of the following fields: Subject, Start Date, Due Date, Importance, Status, Categories, Folder Name, Attachments, etc. Thus, it can be seen that different data sources may have very different sets of data types and schemas.

Figure 2:
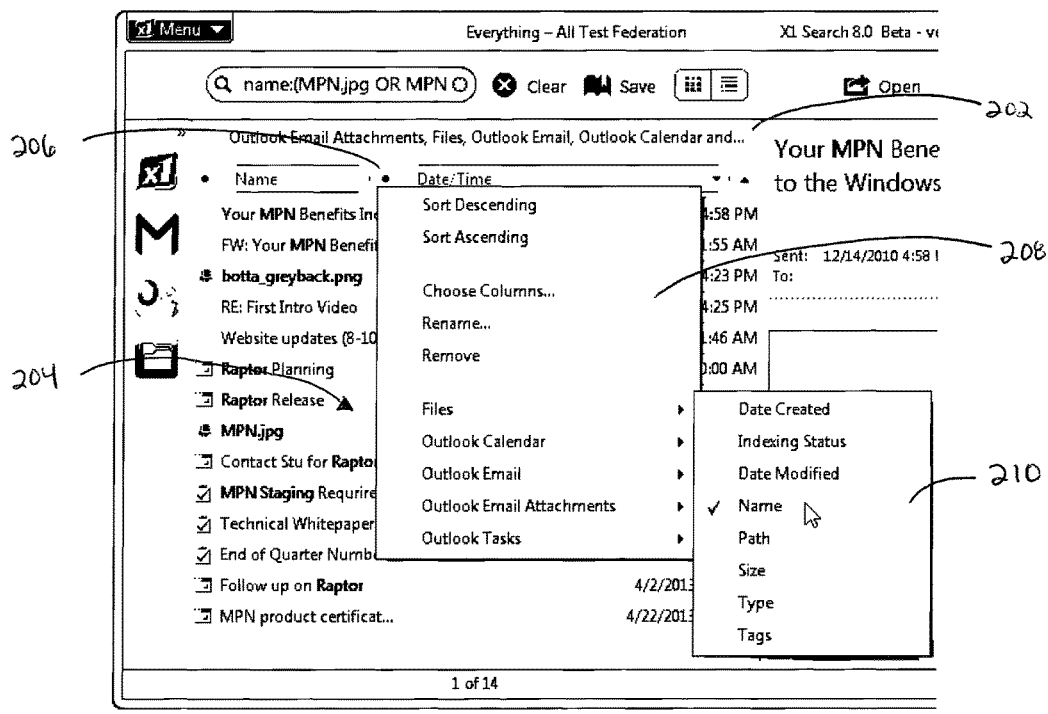
FIG. 2 illustrates an example data source selection and mapping user interface.

An example embodiment, illustrated in FIG. 2, shows an example list of data sources 202 that are included in an example results set 204. The user can right-click (or otherwise activate a corresponding menu display control) on a given column 206 (in this example, the "Name" column) to cause a menu 208 to be displayed. In this example, the menu 208 lists the data sources (e.g., calendar, email, email attachments, tasks, contacts archives, files, documents (e.g., documents including at least text), pictures, videos, music, etc.) included in the overall results set. It is understood that the menu may display multiple sources for a given data type (e.g., multiple email clients/accounts, multiple calendar clients/accounts, etc.). The menu 208 also enables the user to specify whether the data for the selected column is to be sorted and displayed in ascending or descending order. The menu 208 further enables the user to rename columns or remove columns. For a given data source, the user can further select, via cascading menu 210, which specific field of information will be shown in the selected column from the list of available fields/columns for that data source. In this example, the user has indicated that the data from a "name" field is to be displayed in the "Name" column.

By way of illustrative example, the user can select an email source. The email source may include a "date received" field and "date sent" field. The user can specify that the "date sent" field be mapped to a "date" column in the results set user interface, and that data corresponding to the "date received" not be displayed in the results set user interface. By way of still further example, a "file" source may include a "date created" field and a "date last modified" field. The user can map either the "date created" field or the "date last modified" field to the in the results set user interface date column. By yet further example, if the email source includes a "subject" field, and a file source includes a "title" field, then the user may elect to map both to a "name" results set user interface date column. Thus, a user is provided the flexibility to easily map to a given column the source data that is most appropriate from the user's perspective.

Figure 3:
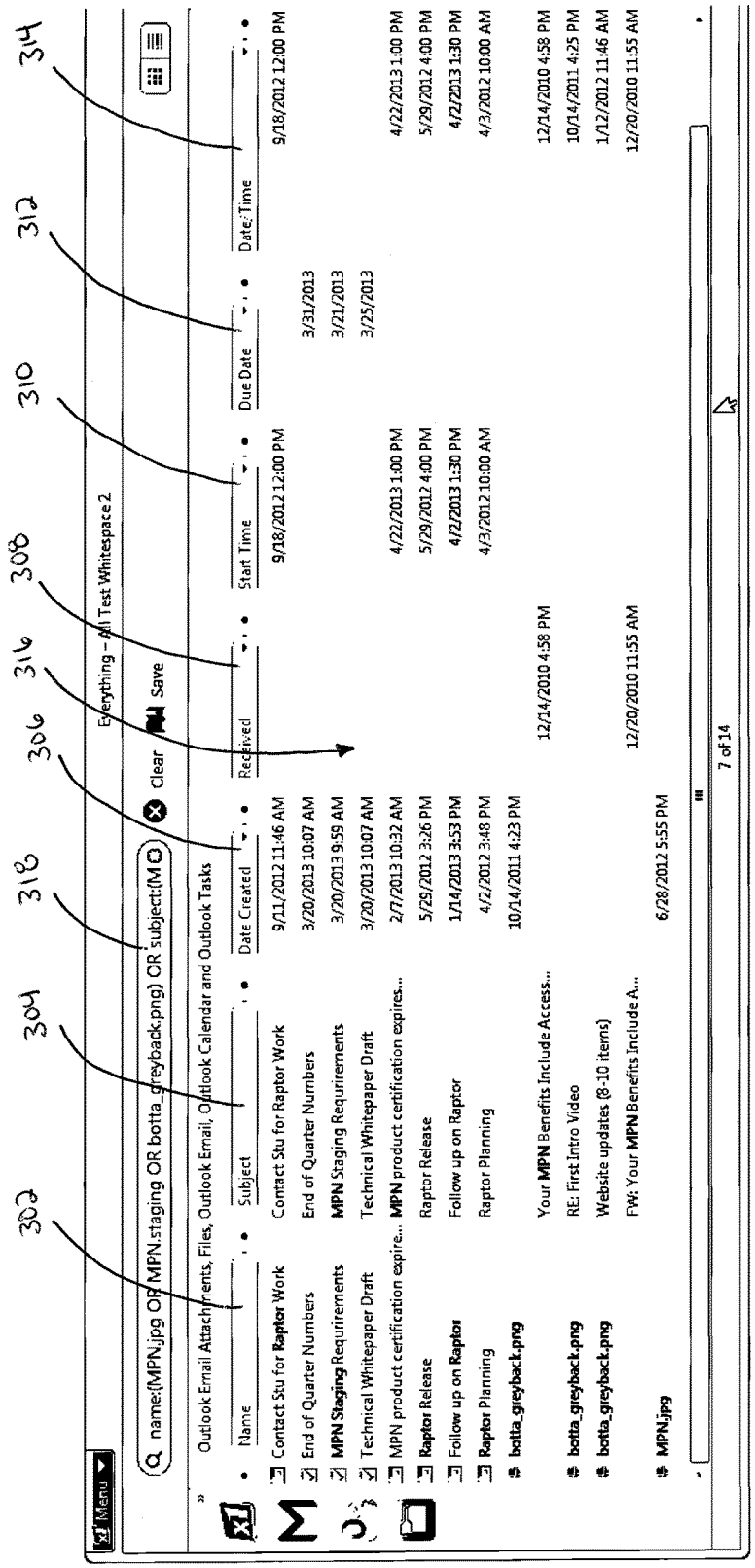
FIG. 3 illustrates a results set user interface.

FIG. 3 illustrates an example interface as it may appear before the user chooses to align or merge several data source values into a single column. In this example, for column 302 the user may instruct that a Name field for a File data type be displayed, and for column 304 that a Subject field for the Email data type be displayed. Thus, the file Name data is displayed in a different column than the email Subject data. For date values, the user may instruct that, for a column 306, the Date Created field for the File data type be displayed, that for a column 308 a Received date field for the Email data type be displayed, for a column 310 a Start Time field for the Calendar data type be displayed, that for a column 312 a Due Date field for a Task data type displayed, and that for a column 314 for the Date/Time field for Email Attachments be displayed.

Conventional applications would typically always display each field in its own column if the application was even capable of displaying the different data in the same results set. Thus, in the example illustrated in FIG. 3, the application would display seven separate columns, with the majority of the cells in the results set 316 being blank, empty of data. For example, the Received column 308 would only display data for Email data and would be blank for File, Calendar, Task, and Email Attachments data. Further, the user would have to search separately against each field (e.g., would have to provide a search query that would refer to each of the different relevant data types for the different data sources). As an example, to search for date results from 2013, the user would have to enter the complicated search term to include date modified, date received, start time, and due date (DateModified:2013 OR Received:2013 OR StartTime:2013 OR DueDate:2013 OR Date/Time:2013) in the main search box 318.

Figure 4:
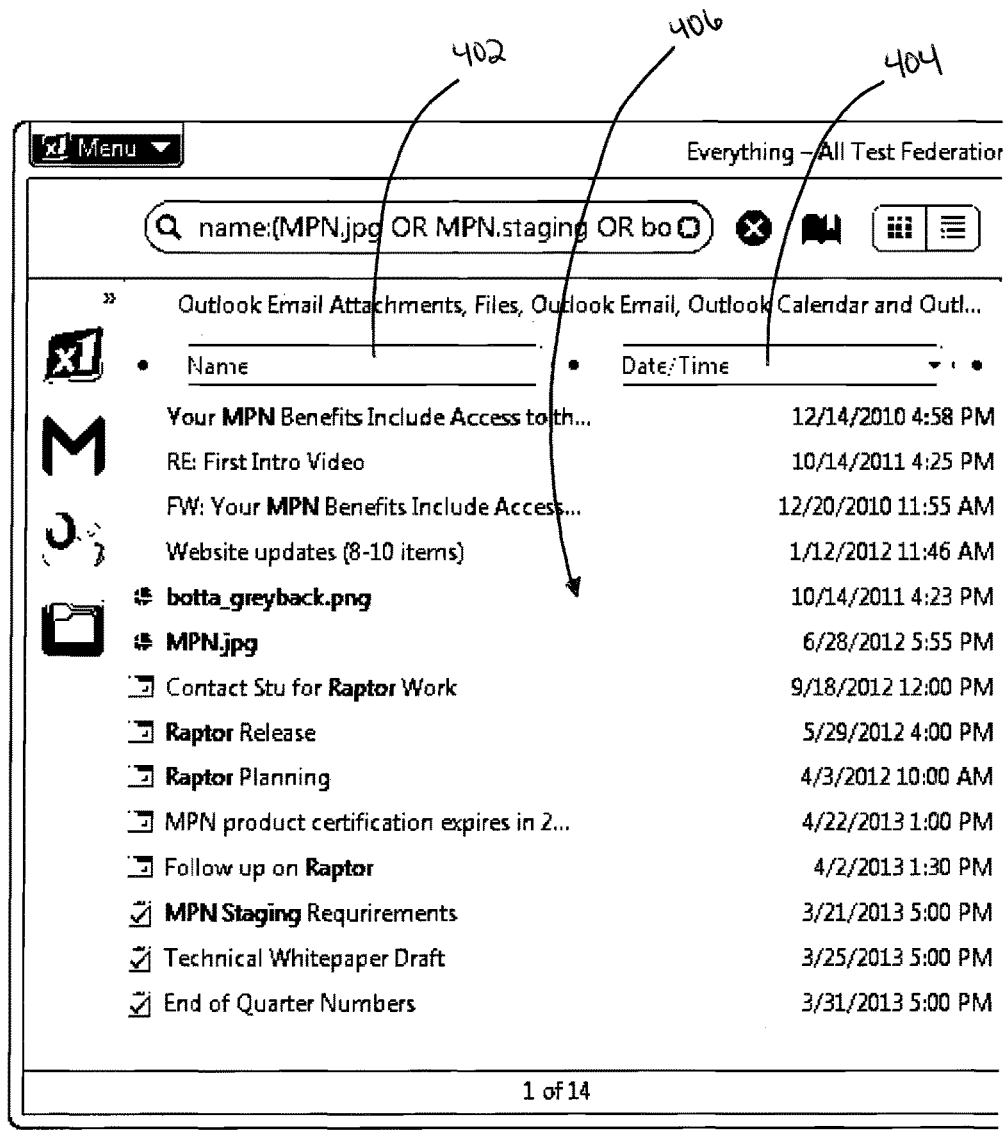
FIG. 4 illustrates an example results set user interface with federated data.

Embodiments disclosed herein optionally solve the problem of displaying results sets where some or the majority of the cells are blank. For example, an interface, such as the example interface shown in FIG. 2, enables the user to define columns/fields such that similar data types, such as the defining date field (e.g., date modified, date received, start time, and due date), are federated/included into a single column (e.g., a "date" column), by specifying, for example a mapping of one or more different data types of data sources to one or more fields, such as columns. A search system may then access an identification of fields (e.g., columns) for a results set user interface, access the mapping, federate different data types from different sources into a given field in accordance with the mapping, and then cause the results set user interface to display the federated data in the specified fields (where some fields in the results set user interface may include federated data and other fields may not include federated data). As illustrated in FIG. 4, the same data illustrated in FIG. 3 has now been federated such that the data for the Name field for the File data type and the data for the Subject field for the Email data type are jointly displayed in column 402. The data for the Date Created field for the File data type, the Received date field for the Email data type, the Start Time field for the Calendar data type, the Due Date field for the Task data type, and the Date/Time field for Email Attachments are jointly displayed in column 404. Because of this unification of the display of disparate data, the user can see results in two columns 402 and 404 that would have previously been displayed in columns 302, 304, 306, 308, 310, 312, and 314. Further, in this example, every cell in the results set 406 is populated with data, and so the problem illustrated in FIG. 3, where the majority of the cells in the results set 316 are blank, is no longer present. Thus, data for multiple columns from multiple sources may be federated and displayed at substantially the same time (e.g., within less than 0.5 seconds of each other, or less than 200 ms of each other).

Additionally, the user can execute a search against a single column, such as column 402 or column 404, without having to construct an elaborate Boolean expression. In FIG. 4, the user could simply enter a search term of '2013' in the search box at the top of column 404 to enable a search across 5 different data sources, each against each data sources' corresponding different date field.

Figure 5:
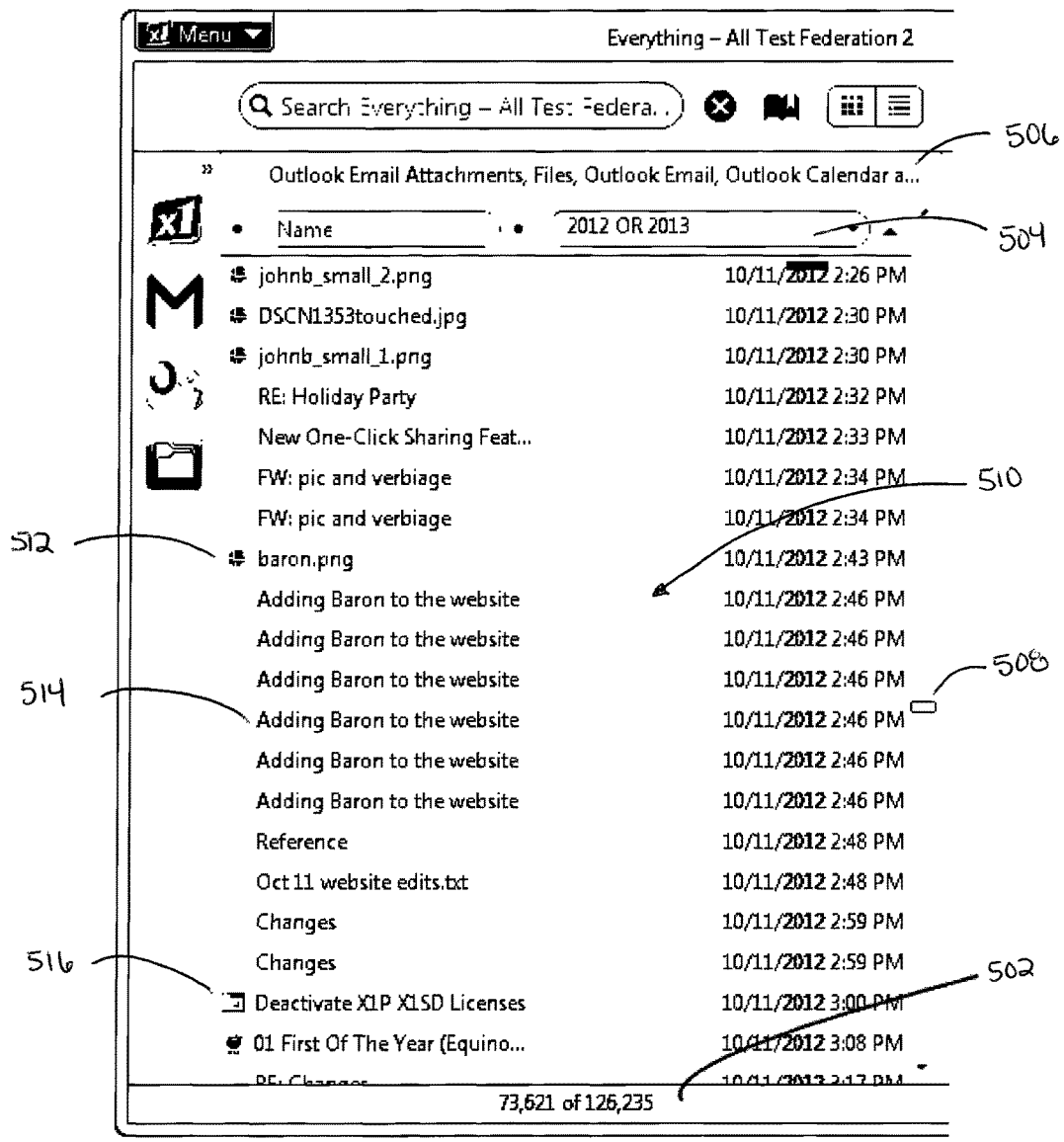
FIG. 5 illustrates a federated results set filtered in accordance with a user query.

This combination of search results returned back from multiple indexes can, in certain instances, reach into the hundreds of thousands or millions of results. The results, as illustrated in FIG. 5, are similar to the results of FIG. 4, but now the total results 502 numbering over 120,000 items that match the search criteria 504 of items with dates of 2012 or 2013 are provided. In this view, the five example data types 506 have been merged together and the user has moved the scrollbar 508 to about the middle of the results set. The results set 510 includes results of different data types within this window, including File results 512, Email results 514, and Calendar results 516.

Figure 6:
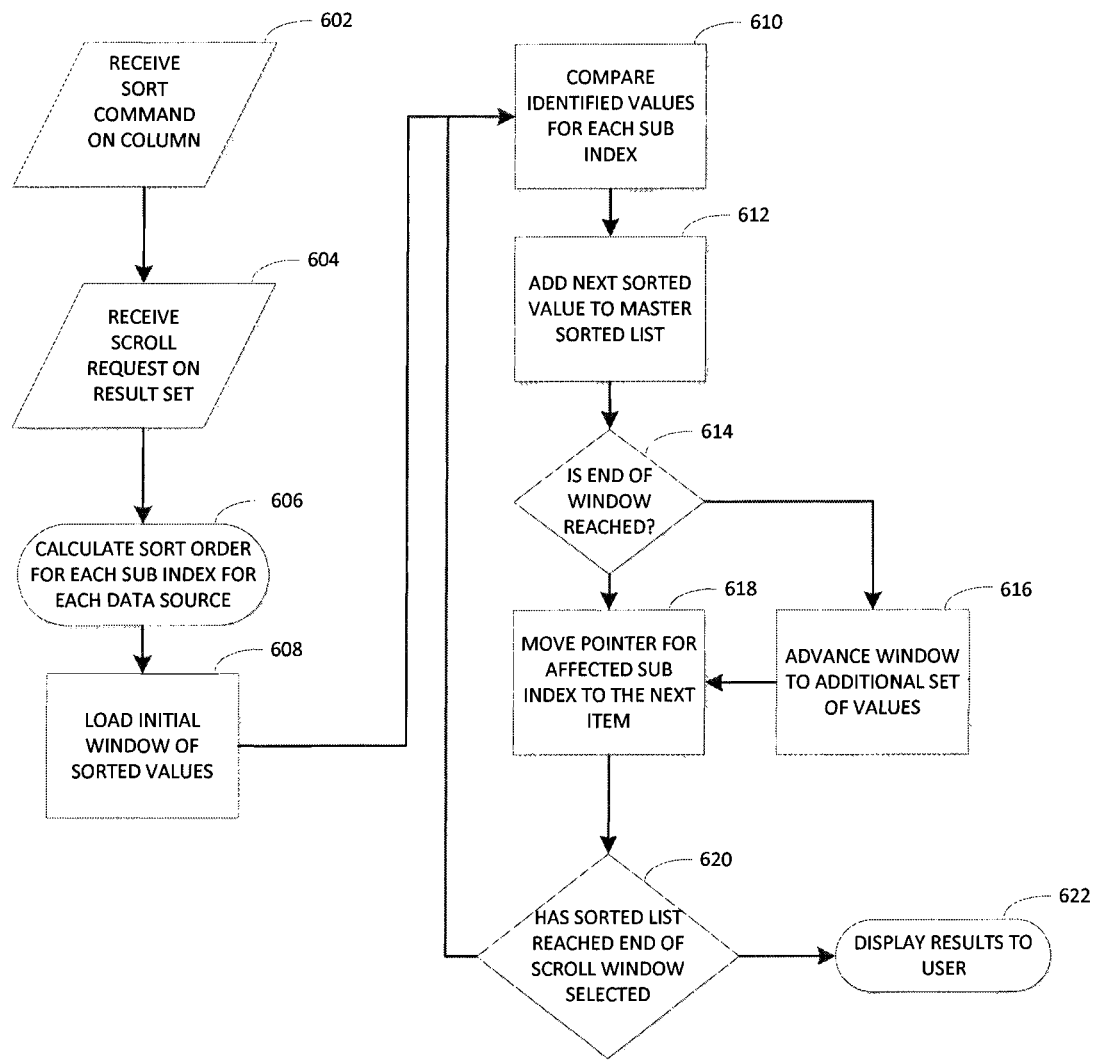
FIG. 6 illustrates an example process.

FIG. 6 illustrates an example process of combining together the results from multiple indexes. At state 602, the user designates a column (or other display structure) to sort the results set against. The user can select one of the columns that had been specified by the user to include different data type from different indexes (e.g., a "date last edited" data type from a document index and a "date/time received" data type from an email index). Optionally, multiple columns can be selected by the user (e.g., simultaneously) to perform additional levels of sorting. The results may be much larger than can be displayed at one time on a display, and so the user may need to scroll through the results. At state 604, optionally by default, the most relevant results (e.g., according to the sort command and/or search command) are displayed at the top of the results list. The user can optionally specify a subset of the results that the user wishes to view, such as by moving a scrollbar adjacent to the results set down to the desired area to display or in such a way that indicates the desired portion of the result sets to be displayed. At state 606, column information for each of the sub-indexes for each of the data sources is sorted according to the user specified column and sort direction.

Optionally, the column information is compressed so that all or a large portion of the column information fits in the system's relatively higher speed volatile random access memory, and the column information can then be sorted using memory-sort algorithms. As an example, each index might have 5 sub-indexes, and there might be 8 different data sources, so there would be 40 (8 data sources×5 sub-indexes) discrete sub-indexes in all.

At state 608, for each discrete sub-index an initial window of values for the first set of sorted results for that sub-index are loaded into memory. As an example, each sub-index might load the first 5, 30, or 100 results. At state 610, the initial identified value for each sub-index will be the first value in each list. The process compares these values to each other to find the next ordered value according to the designated sort. At state 612, this identified value is added to a master sorted list. In this example, the master sorted list includes not just the value used to sort but also includes a unique identifier that specifies the record for that result that enables lookup of some or all the other fields of data associated with that record.

At state 614, this identified value is evaluated to determine if it is the last item in the window of results loaded into memory for that sub-index. If it is, at state 616 an additional window of values is obtained from the appropriate sub-index and loaded into memory. At state 618, a pointer to designate the identified value for the affected sub-index is moved to the next item. At state 620, the current length of the master sorted list is compared with the location of the end of the user positioned scroll window. If the master list has reached the user specified position (or optionally approximately the user specified position), then sub-index comparison ends and, in state 622, the results are displayed to the user, displaying the subset of results that match the size of the currently selected display window and the setting of the scrollbar. If the master sort list is not yet long enough to be at the user specified position, the system returns to state 610 to compare the identified value for each sub-index, including the previously identified value for all but one of the sub-indexes along with the next value for the affected sub-index as identified in state 618. Thus, the process merge-sorts the multiple indexes together, but the merge-sort operation may be paused or halted at state 620 when enough data has been sorted to fill the scroll window being displayed to the user (although more than enough data to file the scroll window may optionally be merged sorted (e.g., between 2-5 times enough data, between 1.5-10 times enough data, etc.). This is particularly advantageous when the user is near the start (or end, as discussed below) of the sorted list, which is typically the most common case.

In the above example process, the sort order proceeded in one direction, according to the user sort command input at state 602. Optionally instead, the sorting may be done in reverse order when the user moves the scrollbar past the half-way mark, and then the result order may be reversed before they are displayed. In this fashion, no more than approximately half the results need to be merged for display to the user. Sorting results that occur when the scrollbar is positioned near to its end will be effectively as fast as sorting that occurs when the scrollbar is positioned near its beginning.

Because the user is able to combine arbitrary columns of data across different data types, the user can choose to sort together different data types, including number, string, date. For example, the user may choose to define a column as the date value of Due Date for a Task index, the number value of Size for a File index, and the string value of Subject for an Email index. This embodiment will properly sort and display mixed data types such as numbers, strings, and dates. The data being displayed from each of the discrete sub-indexes will already be sorted against the other items within that sub-index and can be easily sorted with each other when the data types match each other.

FIG. 7 illustrates an example with various data sources spread across multiple sub-indexes and multiple indexes, including string data 702, number data 704, and date data 706. Within a set of indexes that correspond to a single data type, the sorting is easily determined. For example, in the string data 702, sub-index 708 and sub-index 710 can be readily sorted together using string comparisons. Note that for string comparisons, in this example numbers are treated as simple alphanumeric strings and are sorted accordingly. Thus, the values 1000 and 11 in sub-index 710 are sorted in that order, with 1000 appearing before 11. In a similar fashion, sorting numbers against other numbers or sorting dates against other dates is easily determined.

Thus, the following special cases may be considered: string-to-number sorting, string-to-date sorting, and number-to-date sorting. For a given sorting, the values being sorted (e.g., the current two values being sorted) are first evaluated to determine if there is a conflict. Optionally, in this example, conflicts are only evaluated when one or more of the first few characters of the value in question are numeric. For example, optionally the sorting rules may specify that a value that only consists of number values will always sort ahead of a value that includes any alphabetic characters. Thus, no conflict will arise when sorting the string value 'ape' with the numeric value '20' ('20' will be sorted before 'ape' using such a rule). As can be seen in sub-index 708, even if the value '20' was a string value, it would sort ahead of 'ape'. In order to handle conflicts, one of the sorting methods can be given priority over the other sorting methods when two different data types are being compared.

In this example, number sorts are given priority over string sorts, number sorts are given priority over date sorts, and date sorts are given priority over string sorts. When strings from two different data types are to be compared, they will be compared with the sorting method that has priority between those two data types. For example, when comparing the string '100' and the number '11' the two values are compared as numbers and '11' would sort ahead of '100'. Although dates are displayed in various formats, for sort comparison, they will be analyzed as a whole number of years with a decimal value applying to the month and date. For example, Jul. 1, 2013 would be sorted using the value 2013.50. Therefore when comparing the numeric values '2013' and '2014' and the date 'Jul. 1, 2013' the sort order would be determined by numeric sorting and the display order would be '2013', 'Jul. 1, 2013', '2014'.

Thus, as described above, certain embodiments provide a mechanism to enable a user to execute search queries rapidly and incrementally across a multitude of separate and discrete indexes and view the results set in a single window that can be further refined with additional query parameters. The user can customize and define the display of data to provide a dense visualization of information through a flexible and easy method to search multiple indexes simultaneously. Because the results are optionally all shown in a single results pane (optionally by scrolling through the results accessed via the results pane) and powerful queries against these multiple discrete indexes can be easily submitted, the user is able to efficiently and quickly scroll through all of the responsive items, even when they number in the millions, and refine the search parameters to filter the results down to precisely the item or items the user was trying to find.

The methods and processes described herein may have fewer or additional steps or states and the steps or states may be performed in a different order. Not all steps or states need to be reached. The methods and processes described herein may be embodied in, and fully or partially automated via, software code modules executed by one or more general purpose computers. The code modules may be stored in any type of computer-readable medium or other computer storage device. Some or all of the methods may alternatively be embodied in whole or in part in specialized computer hardware. The systems described herein may optionally include displays, user input devices (e.g., touchscreen, keyboard, mouse, voice recognition, etc.), network interfaces, etc. While reference may be made to displaying or storing data in a row or column, other display formats and organizations or data storage structures may be used.

The results of the disclosed methods may be stored in any type of computer data repository, such as relational databases and flat file systems that use volatile and/or nonvolatile memory (e.g., magnetic disk storage, optical storage, EEPROM and/or solid state RAM).

While the phrase "click" may be used with respect to a user selecting a control, menu selection, or the like, other user inputs may be used, such as voice commands, text entry, gestures, etc. User inputs may, by way of example, be provided via an interface, such as via text fields, wherein a user enters text, and/or via a menu selection (e.g., a drop down menu, a list or other arrangement via which the user can check via a check box or otherwise make a selection or selections, a group of individually selectable icons, etc.). When the user provides an input or activates a control, a corresponding computing system may perform the corresponding operation. Some or all of the data, inputs and instructions provided by a user may optionally be stored in a system data store (e.g., a database), from which the system may access and retrieve such data, inputs, and instructions. The notifications and user interfaces described herein may be provided via a Web page, a dedicated or non-dedicated phone application, computer application, a short messaging service message (e.g., SMS, MMS, etc.), instant messaging, email, push notification, audibly, and/or otherwise.

The user terminals described herein may be in the form of a mobile communication device (e.g., a cell phone), laptop, tablet computer, interactive television, game console, media streaming device, head-wearable display, networked watch, etc. They may optionally include displays, user input devices (e.g., touchscreen, keyboard, mouse, voice recognition, etc.), network interfaces, etc.

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the invention can be practiced in many ways. As is also stated above, the use of particular terminology when describing certain features or aspects of certain embodiments should not be taken to imply that the terminology is being re-defined herein to be restricted to including any specific characteristics of the features or aspects of the invention with which that terminology is associated.

What is claimed is:

1. A method of federating search results, the method comprising:
  receiving an identification of a first data source associated with a first schema comprising a first plurality of data fields, the first data source comprising data of a first type;
  receiving an identification of a second data source associated with a second schema comprising a second plurality of data fields comprising different data fields than data fields in the first plurality of data fields, the second data source comprising data of a second type, the second type different than the first type;

accessing an identification of a plurality of columns for a results set user interface, the plurality of columns comprising at least a first column and a second column;

accessing a mapping of a first field in the first plurality of data fields to the first column of the results set user interface, wherein the first field in the first plurality of data fields corresponds to a first type of data;

accessing a mapping of a first field in the second plurality of data fields to the first column of the results set user interface, wherein the first field in the second plurality of data fields corresponds to a second type of data different than the first type of data;

generating a first inverted index for the first type of data of the first data source;

generating a second inverted index for the second type of data of the second data source;

causing, at least in part, data of the first type of data from the first data source and data of the second type of data from the second data source to be merged and displayed in the first column of the results set user interface on a user terminal wherein the results set user interface:

displays at the same time at least the first column and the second column, the first column including the first type of data of the first data source and the second type of data of the second data source, and displays at the same time a first search field associated with the first column and a second search field associated with the second column, the first search field configured to receive a textual search query and enabling a user to conduct a search, using the textual search query, restricted to the first column of the plurality of columns of the results set user interface;

in response to receiving a textual search query from the user via the first search field associated with the first column, conducting a search restricted to the first column, the search comprising:

searching the first inverted index for the first type of data of the first data source and identifying data of the first type of data of the first data source that correspond to the textual search query, searching the second inverted index for the second type of data of the second data source and identifying data of the second type of data of the second data source that correspond to the textual search query, causing identified data of the first type of data that corresponds to the textual search query and identified data of the second type of data that corresponds to the textual search query to be displayed at the same time in the same first column, wherein the first column is a single column.

2. The method as defined in claim 1, the method further comprising:

accessing a mapping of a second field in the first plurality of data fields associated with the first data source to the second column of the results set user interface, wherein the second field in the first plurality of data fields corresponds to a third type of data;

accessing a mapping of a second field in the second plurality of data fields associated with the second data source to the second field of the results set user interface, wherein the second field in the second plurality of data fields corresponds to a fourth type of data, and the fourth type of data is different than the third type of data;

causing, at least in part, the third type of data from the first data source and the fourth type of data from the second data source to be merged and displayed in the second column on a user terminal, at substantially the same time as causing, at least in part, the first type of data from the first data source and the second type of data from the second data source to be merged and displayed in the first column on the user terminal; and wherein the second search field associated with the second column enables a user to conduct a search restricted to the second column of the plurality of columns of the results set user interface.

3. The method as defined in claim 1, the method further comprising:

providing for display on the user terminal a menu of data sources;

enabling the user to select a plurality of data sources to be included in the results set;

receiving and storing a user selection of a first plurality of data sources to be included in the results set;

enabling the user to specify a mapping of a plurality of different data types from at least a portion of the first plurality of data sources to at least one results set column;

receiving and storing a user mapping of a first plurality of different data types to a results set field; and based at least in part on the user mapping, causing at least in part the first plurality of different data types to be displayed in the results set field specified in the user mapping.

4. The method as defined in claim 1, wherein:
the first data source is an email data source;
the first type of data is subject;
the second data source is a document data source; and
the second type of data is name,
wherein the email subject data associated with the first data source and the document name data associated with the second data source are merged and displayed in the first column of the results set user interface.

5. The method as defined in claim 1, wherein:
the first data source is an email data source;
the first type of data indicates date received;
the second data source is a document data source; and
the second type of data indicates date last edited,
wherein the email date received data associated with the first data source and the date last edited data associated with the second data source are merged and displayed in the first column of the results set user interface.

6. The method as defined in claim 1, wherein the first type of data is string and the second type of data is number or date.

7. The method as defined in claim 1, the method further comprising:

receiving via the first search field a search query from a user comprising a plurality of characters;

as the user enters the plurality of characters, incrementally filtering the merged data in the first column, including the data of the first type from the first data source and the data of the second type from the second data source; and causing the incrementally filtered merged data to be displayed in the first column.

8. The method as defined in claim 1, the method further comprising:

receiving a sort instruction from the user;

sorting at least a portion of the merged data of the first type of data and the second type of data, wherein the data of the first type is a string, number or date, and the data of the second type is different than the data of the first type;

providing the sorted portion of the merged data of the first type and the second type for display in the first column of the results set user interface.

9. The method as defined in claim 1, wherein the first data source comprises a calendar data source, an email data source, an email attachments data source, a tasks data source, a contacts data source, a files data source, and/or a documents data source.

10. The method as defined in claim 1, wherein the first column corresponds to a name field, a document type field, a date field, a from field, a to field, a subject field, a path field, a source type field, a status field, an attachment field, a size field, an event start time field, an event end time field, or an event location field.

11. The method as defined in claim 1, wherein each of the plurality of columns of the results set user interface comprises a search field configured to receive query text for searching only the data in the respective column, and a search field is provided configured to receive query text for searching across all of the plurality of columns.

12. A search federation system, comprising:
 a computing system comprising hardware;
 a non-transitory computer storage medium having stored thereon executable instructions that direct the computing system to perform operations comprising:
 receiving an identification of a first data source associated with a first schema comprising a first plurality of data fields, the first data source comprising data of a first type;
 receiving an identification of a second data source associated with a second schema comprising a second plurality of data fields comprising different data fields than data fields in the first plurality of data fields, the second data source comprising data of a second type, the second type different than the first type;
 accessing an identification of a plurality of fields for a results set user interface, the plurality of results set user interface fields comprising at least a first results set user interface field and a second results set user interface field;
 accessing a mapping of a first field in the first plurality of data fields associated with the first data source to the first field of the results set user interface, wherein the first field in the first plurality of data fields associated with the first data source corresponds to a first type of data;
 accessing a mapping of a first field in the second plurality of data fields associated with the second data source to the first field of the results set user interface, wherein the first field in the second plurality of data fields corresponds to a second type of data different than the first type of data;
 generating a first inverted index for the first type of data of the first data source;
 generating a second inverted index for the second type of data of the second data source;
 causing, at least in part, data of the first type of data from the first data source and data of the second type of data from the second data source to be merged and displayed in the first field of the results set user interface on a user terminal;
 wherein the results set user interface:
  displays at the same time at least the first field and the second field of the results set user interface, the first field of the results set user interface including the first type of data of the first data source and the second type of data of the second data source, and
  displays at the same time a first search field associated with the first field of the results set user interface and a second search field associated with the second field of the results set user interface, the first search field configured to receive a textual search query and enabling a user to conduct a search, using the textual search query, restricted to the first field of the plurality of fields of the results set user interface;
 in response to receiving a textual search query from the user via the first search field associated with the first field of the results set user interface, conducting a search restricted to the first field of the results set user interface, the search comprising:
  searching the first inverted index for the first type of data of the first data source and identifying data of the first type of data of the first data source that correspond to the textual search query,
  searching the second inverted index for the second type of data of the second data source and identifying data of the second type of data of the second data source that correspond to the textual search query,
 causing identified data of the first type of data that corresponds to the textual search query and identified data of the second type of data that corresponds to the textual search query to be displayed at the same time in the same first field of the results set user interface.

13. The system as defined in claim 12, the operations further comprising:
 accessing a mapping of a second field in the first plurality of data fields associated with the first data source to the second field of the results set user interface, wherein the second field in the first plurality of data fields associated with the first data source corresponds to a third type of data;
 accessing a mapping of a second field in the second plurality of data fields associated with the second data source to the second field of the results set user interface, wherein the second field in the second plurality of data fields corresponds to a fourth type of data, and the fourth type of data is different than the third type of data;
 causing, at least in part, the third type of data from the first data source and the fourth type of data from the second data source to be merged and displayed in the second field of the results set user interface on a user terminal, at substantially the same time as causing, at least in part, the first type of data from the first data source and the second type of data from the second data source to be merged and displayed in the second field on the user terminal;
 wherein the second search field associated with the second field of the results set user interface enables a user to conduct a search restricted to the second field of the results set user interface.

14. The system as defined in claim 12, the operations further comprising:
 providing for display on the user terminal a menu of data sources;
 enabling the user to select a plurality of data sources to be included in the results set;
 receiving and storing a user selection of a first plurality of data sources to be included in the results set;

enabling the user to specify a mapping of a plurality of different data types from at least a portion of the first plurality of data sources to at least one results set field;

receiving and storing a user mapping of a first plurality of different data types to a results set field; and based at least in part on the user mapping, causing at least in part the first plurality of different data types to be displayed in the results set field specified in the user mapping.

15. The system as defined in claim 12, wherein:
the first data source is an email data source;
the first type of data is subject;
the second data source is a document data source; and
the second type of data is name,
wherein the email subject data associated with the first data source and the document name data associated with the second data source are merged and displayed in the first field of the results set user interface.

16. The system as defined in claim 12, wherein:
the first data source is an email data source;
the first type of data indicates date received;
the second data source is a document data source; and
the second type of data indicates date last edited,
wherein the email date received data associated with the first data source and the date last edited data associated with the second data source are merged and displayed in the first field of the results set user interface.

17. The system as defined in claim 12, wherein the first type of data is string and the second type of data is number or date.

18. The system as defined in claim 12, wherein the first field comprises a column.

19. The system as defined in claim 12, the operations further comprising:
receiving via the first search field a search query from a user comprising a plurality of characters;
as the user enters the plurality of characters, incrementally filtering the merged data in the first field of the results set user interface, including the data of the first type from the first data source and data of the second type from the second data source; and
causing the incrementally filtered merged data to be displayed in the first field.

20. The system as defined in claim 12, the operations further comprising:
receiving a sort instruction from the user;
sorting at least a portion of the merged data of the first type and of the second type, wherein the data of the first type is a string, number or date, and the data of the second type is different than the data of the first type;
providing the sorted portion of the merged data of the first type and the second type for display in the first field of the results set user interface.

21. The system as defined in claim 12, wherein the first field of the results set user interface corresponds to a name field, a document type field, a date field, a from field, a to field, a subject field, a path field, a source type field, a status field, an attachment field, a size field, an event start time field, an event end time field, or an event location field.

22. The system as defined in claim 12, wherein each of the plurality of fields of the results set user interface comprises a user interface configured to receive query text for searching only the data in the respective field of the results set user interface, and a search user interface is provided configured to receive query text for searching across all of the plurality of fields of the results set user interface.

23. A non-transitory computer storage medium having stored thereon executable instructions that when executed by a computer system direct the computing system to perform operations comprising:
receiving an identification of a first data source associated with a first schema comprising a first plurality of data fields, the first data source comprising data of a first type;

receiving an identification of a second data source associated with a second schema comprising a second plurality of data fields comprising different data fields than data fields in the first plurality of data fields, the second data source comprising data of a second type, the second type different than the first type;

accessing an identification of a plurality of fields for a results set user interface, the plurality of results set user interface fields comprising at least a first results set user interface field and a second results set user interface field;

accessing a mapping a first field in the first plurality of data fields associated with the first data source to the first field of the results set user interface, wherein the first field in the first plurality of data fields associated with the first data source corresponds to a first type of data;

accessing a mapping of a first field in the second plurality of data fields associated with the second data source to the first field of the results set user interface, wherein the first field in the second plurality of data fields corresponds to a second type of data different than the first type of data;

generating a first inverted index for the first type of data of the first data source;

generating a second inverted index for the second type of data of the second data source;

causing, at least in part, data of the first type of data from the first data source and data of the second type of data from the second data source to be merged and displayed in the first field of the results set user interface on a user terminal;

wherein the results set user interface:
displays at the same time at least the first field and the second field, the first field including the first type of data of the first data source and the second type of data of the second data source, and displays at the same time a first search field associated with the first field and a second search field associated with the second field, the first search field configured to receive a textual search query and enabling a user to conduct a search, using the textual search query, restricted to the first field of the plurality of fields of the results set user interface;

in response to receiving a textual search query from the user via the first search field associated with the first field of the results set user interface, conducting a search restricted to the first field of the results set user interface, the search comprising:
searching the first inverted index for the first type of data of the first data source and identifying data of the first type of data of the first data source that correspond to the textual search query, searching the second inverted index for the second type of data of the second data source and identifying data of the second type of data of the second data source that correspond to the textual search query, causing identified data of the first type of data that corresponds to the textual search query and identified data of the second type of data that corresponds to the textual search query to be displayed at the same time in the same first field of the results set user interface.

24. The non-transitory computer storage medium as defined in claim 23, wherein each of the plurality of fields of the results set user interface comprises a user interface configured to receive query text for searching only the data in the respective field of the results set user interface, and a search user interface is provided configured to receive query text for searching across all of the plurality of fields of the results set user interface.

\* \* \* \* \*